(12) United States Patent
Kottilingam et al.

(10) Patent No.: US 9,482,249 B2
(45) Date of Patent: Nov. 1, 2016

(54) THREE-DIMENSIONAL PRINTING PROCESS, SWIRLING DEVICE AND THERMAL MANAGEMENT PROCESS

(71) Applicant: GENERAL ELECTRIC COMPANY, Schenectady, NY (US)

(72) Inventors: Srikanth Chandrudu Kottilingam, Simpsonville, SC (US); Victor John Morgan, Simpsonville, SC (US); Benjamin Paul Lacy, Greer, SC (US); John Wesley Harris, Jr., Taylors, SC (US); David Edward Schick, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 454 days.

(21) Appl. No.: 14/020,997

(22) Filed: Sep. 9, 2013

(65) Prior Publication Data
US 2015/0068629 A1 Mar. 12, 2015

(51) Int. Cl.
*F15D 1/00* (2006.01)
*B22F 3/105* (2006.01)
(Continued)

(52) U.S. Cl.
CPC ............ *F15D 1/0015* (2013.01); *B22F 3/1055* (2013.01); *B22F 5/009* (2013.01); *B33Y 10/00* (2014.12); *F01D 5/18* (2013.01); *F01D 11/24* (2013.01); *B29C 67/0077* (2013.01); *B33Y 80/00* (2014.12); *F05D 2240/127* (2013.01); *F05D 2240/81* (2013.01); *F05D 2260/204* (2013.01); *F05D 2260/221* (2013.01); *F05D 2260/2212* (2013.01); *F25B 9/04* (2013.01); *Y02P 10/295* (2015.11); *Y10T 137/2087* (2015.04)

(58) Field of Classification Search
CPC ........ F15D 1/0015; F15D 5/187; F25B 9/04; B29C 67/0077; B23K 26/345; B33Y 10/00; B33Y 80/00
USPC ........ 137/808; 264/497; 219/76.14, 74; 62/5
See application file for complete search history.

(56) References Cited

U.S. PATENT DOCUMENTS 1,952,281 A * 3/1934 Ranque ..................... F25B 9/04
126/247
3,973,396 A * 8/1976 Kronogard ................ F02C 7/18
415/116
(Continued)

FOREIGN PATENT DOCUMENTS

DE 102004032093 A1 1/2006
WO 2012066311 A2 5/2012

OTHER PUBLICATIONS

European Search Report and Written Opinion issued in connection with corresponding EP Application No. 14183587.6-1353 dated Apr. 13, 2015.

*Primary Examiner* — Jacob Cigna
(74) *Attorney, Agent, or Firm* — McNees Wallace & Nurick LLC

(57) ABSTRACT

A three-dimensional printing process, a swirling device, and a thermal management process are disclosed. The three-dimensional printing process includes distributing a material to a selected region, selectively laser melting the material, and forming a swirling device from the material. The swirling device is printed by selective laser melting. The thermal management process includes providing an article having a swirling device printed by selective laser melting, and cooling a portion of the article by transporting air through the swirling device.

17 Claims, 5 Drawing Sheets

(51) Int. Cl.
  *B22F 5/00* (2006.01)
  *B33Y 10/00* (2015.01)
  *F01D 5/18* (2006.01)
  *F01D 11/24* (2006.01)
  *B29C 67/00* (2006.01)
  *B33Y 80/00* (2015.01)
  *F25B 9/04* (2006.01)

(56) References Cited

U.S. PATENT DOCUMENTS

| | | | | |
|---|---|---|---|---|
| 4,293,275 A * | 10/1981 | Kobayashi | | F01D 5/187 416/96 R |
| 4,451,201 A * | 5/1984 | Colgate | | F01D 1/34 415/181 |
| 4,818,178 A | 4/1989 | Sibbertsen | | |
| 5,837,960 A * | 11/1998 | Lewis | | B23K 26/34 219/121.63 |
| 6,391,251 B1 * | 5/2002 | Keicher | | B05B 7/14 419/7 |
| 6,504,127 B1 * | 1/2003 | McGregor | | B23K 26/0604 219/121.63 |
| 6,609,884 B2 * | 8/2003 | Harvey | | F01D 5/187 415/115 |
| 7,128,533 B2 * | 10/2006 | Liang | | F01D 5/186 416/97 R |
| 7,390,168 B2 | 6/2008 | Liang | | |
| 8,043,059 B1 | 10/2011 | Liang | | |
| 8,152,463 B2 * | 4/2012 | Haselbach | | F01D 5/187 415/115 |
| 8,221,055 B1 | 7/2012 | Liang | | |
| 8,277,743 B1 * | 10/2012 | Ramberg | | F01N 3/28 422/129 |
| 8,382,431 B1 | 2/2013 | Liang | | |
| 2006/0280607 A1 * | 12/2006 | Harvey | | F01D 5/187 416/97 R |
| 2012/0152501 A1 * | 6/2012 | Harvey | | F28F 9/026 165/109.1 |

* cited by examiner

THREE-DIMENSIONAL PRINTING PROCESS, SWIRLING DEVICE AND THERMAL MANAGEMENT PROCESS

FIELD OF THE INVENTION

The present invention is directed to manufactured articles, processes of manufacturing, and thermal management processes from using such manufactured articles. More specifically, the present invention is directed to printed swirling devices and manufactured articles and processes including printed swirling devices.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, one common method of increasing temperature capability of a turbine component includes the use of complex cooling channels. The complex cooling channels are often incorporated into metals and alloys used in high temperature regions of gas turbines. The complex cooling channels can be difficult to form. Casting in the channels can require complex molds that are difficult to position and control placement of near the hot gas path where cooling is required. Machining in the channels after casting then requires closing them off at the surface through methods such as brazing and/or thermal spraying of materials often inadvertently fills the complex cooling channels blocking the flow of cooling fluids, such as air from a compressor section of a gas turbine. Some designs are actually not capable of being manufactured using traditional methods due to their complexity and require use of methods such as powder bed laser sintering.

If brazing of materials to a surface of the substrate to cover the channels is performed, the brazing temperatures required to sufficiently braze the material may soften the material. The softened material can sag or droop into the complex cooling channels, blocking them as they harden. As such, brazing requires a very narrow temperature range, outside of which the component can be damaged or made unusable. In general, machining of channels can be very difficult.

If thermal spraying of coatings is performed, the sprayed materials can fill the complex cooling channels with the coating. To avoid filling the complex cooling channels, a fill and leech method can be used. The fill and leech method includes filling the complex cooling channels with a sacrificial material, coating the component and leeching the sacrificial material to form the complex cooling channels. Such methods are expensive, difficult to apply and remove, and often have a high scrap rate. Also, making miniature-sized components and features using traditional manufacturing methods exacerbates such drawbacks.

A manufacturing process, a swirling device, and a thermal management process that do not suffer from one or more of the above drawbacks would be desirable in the art.

BRIEF DESCRIPTION OF THE INVENTION

In an embodiment, a three-dimensional printing process includes distributing a material to a selected region, selectively laser melting the material, and forming a swirling device from the material.

In another embodiment, a swirling device is printed by selective laser melting.

In another embodiment, a thermal management process includes providing an article having a swirling device printed by selective laser melting, and cooling a portion of the article by transporting air through the swirling device.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
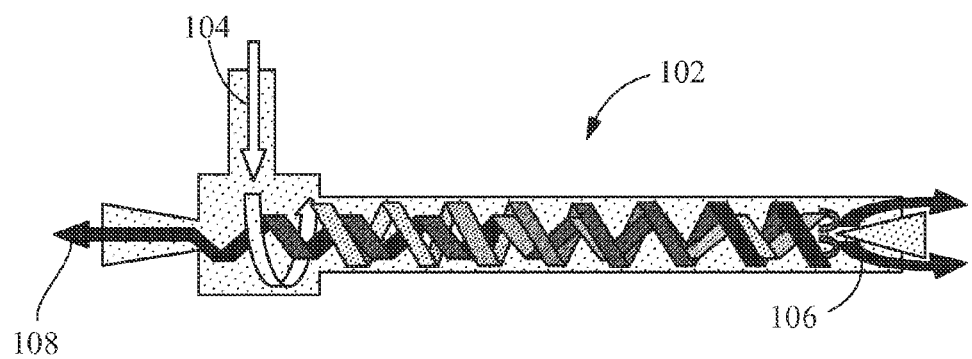
FIG. 1 is a side schematic view of a swirling device, specifically a vortex tube, according to an embodiment of the disclosure.

Provided is a manufacturing process, a swirling device, and a thermal management process. Embodiments of the present disclosure, in comparison to processes and articles that do not include one or more of the features disclosed herein, provide additional cooling, permit cooling in new regions, permit cooling with new materials, permit cooler and/or hotter streams to be directed from flow within turbine components, permit swirling without separation into multiple streams, permit the useful life of turbine components to be extended, permit turbine systems using embodiments of the turbine components to be more efficient, permit use of cooler streams to cool hot spots, permit use of hotter streams to heat cool spots, permit adjustable control of temperature and/or temperature uniformity, prevent undesirable effects (for example, thermal fatigue, oxidation, creep, or combinations thereof) through thermal management/distribution, permit use of less expensive materials, permit a reduction of cooling flow (for example, raising efficiency, increasing throughout, and/or reducing emissions), or a combination thereof.

FIGS. 1-4 and 10 show embodiments of a swirling device 102, such as a vortex tube (see FIGS. 1-2) or a swirling heat transfer device 608 (see FIG. 10), capable of being manufactured by selective laser melting. As used herein, the term "vortex tube" refers to an arrangement that passively separates a flow 104 into a hotter stream 106 from a cooler stream 108 through rotation of the flow 104. An example of the vortex tube is a Ranque-Hilsch vortex tube. In contrast, the swirling heat transfer device 608 does not separate the flow 104 into the hotter stream 106 and the cooler stream 108, and instead, performs heat transfer and flows though a single stream 610, which is a capable of being through a flush surface of the swirling heat transfer device 608 or through an elongate tube portion of the swirling heat transfer device 608 having any suitable length.

The swirling device 102 has any suitable dimensions. Suitable dimensions include, but are not limited to, having a diameter or maximum width of between about 0.25 inches and about 0.75 inches, between about 0.3 inches and about 0.6 inches, between about 0.4 inches and about 0.6 inches, about 0.5 inches, or any suitable combination, sub-combination, range, or sub-range therein. Other suitable dimensions include, but are not limited to, having a maximum height of between about 0.05 inches and about 0.2 inches, between about 0.05 inches and about 0.15 inches, between about 0.1 inches and about 0.2 inches, between about 0.06 inches and about 0.3 inches, about 0.1 inches, about 0.05 inches, about 0.06 inches, about 0.2 inches, about 0.3 inches, or any suitable combination, sub-combination, range, or sub-range therein.

The selective laser melting is achieved by any suitable three-dimensional printing or additive printing process. In one embodiment, the selective laser melting distributes an atomized powder onto a substrate plate (not shown) using a coating mechanism (not shown). The substrate plate is positioned within a chamber (not shown) having a controlled atmosphere, for example, an inert gas, such as argon, nitrogen, other suitable inert gases, or a combination thereof. The atomized powder is melted, for example, by electron beam melting, laser melting, or other melting from other energy sources, to form a portion or layer of a three-dimensional product, such as, a portion of the swirling device 102. The process is repeated to form the three-dimensional product, such as the swirling device 102, which is capable of being a vortex tube, a heat transfer device, or any other suitable device with the capability of swirling a fluid.

The selective laser melting is achieved from a predetermined design file or two-dimensional slices of a three-dimensional file, for example, from a computer-aided design program. The thickness of the two-dimensional slices determines the resolution of the selective laser melting. For example, when the two-dimensional slices are 20 micrometers thick, the resolution will be greater than when the two-dimensional slices are 100 micrometers thick for the selective laser melting of a predetermined component, such as, the swirling device 102. In one embodiment, the swirling device 102 formed from the selective laser melting is near-net-shape.

The atomized powders are thermoplastic, metal, metallic, ceramic, other suitable materials, or a combination thereof. Suitable materials for the atomized powder include, but are not limited to, stainless steel, tool steel, cobalt chrome, titanium, nickel, aluminum, alloys thereof, and combinations thereof. In one embodiment, the materials for the atomized powders correspond with materials of a substrate, such as, an alloy suitable for the hot-gas path of a turbine system (for example, nickel-based superalloys, cobalt-based superalloys, or other suitable superalloys).

In one embodiment, the substrate has a composition, by weight, of about 13.70% to about 14.3% chromium, about 9% to 10% cobalt, about 3.5% to about 4.1% tungsten, about 1.4% to about 1.7% molybdenum, about 4.7% to about 5.1% titanium, about 2.8% to about 3.2% aluminum, about 0.08% to about 0.12% carbon, about 0.005% to about 0.02% boron, about 2.4% to about 3.1% tantalum, about 0.04% zirconium, 0.35% iron, 0.3% silicon, about 0.1% manganese, about 0.1% copper, about 0.015% phosphorus, about 0.005% sulfur, about 0.15% niobium, incidental impurities, and a balance of nickel.

In one embodiment, the substrate has a composition, by weight, of about 9.75% chromium, about 7.5% cobalt, about 3.5% titanium, about 4.2% aluminum, about 6.0% tungsten, about 1.5% molybdenum, about 4.8% tantalum, about 0.08% carbon, about 0.009% zirconium, about 0.009% boron, incidental impurities, and a balance of nickel.

Suitable materials for the substrate is a nickel-based alloy or a cobalt-based alloy. In one embodiment, the substrate has a composition, by weight, of between about 8.0% and about 8.7% chromium, between about 9% and about 10% cobalt, between about 5.25% and about 5.75% aluminum, up to about 0.9% titanium (for example, between about 0.6% and about 0.9%), between about 9.3% and about 9.7% tungsten, up to about 0.6% molybdenum (for example, between about 0.4% and about 0.6%), between about 2.8% and about 3.3% tantalum, between about 1.3% and about 1.7% hafnium, up to about 0.1% carbon (for example, between about 0.07% and about 0.1%), up to about 0.02% zirconium (for example, between about 0.005% and about 0.02%), up to about 0.02% boron (for example, between about 0.01% and about 0.02%), up to about 0.2% iron, up to about 0.12% silicon, up to about 0.1% manganese, up to about 0.1% copper, up to about 0.01% phosphorus, up to about 0.004% sulfur, up to about 0.1% niobium, incidental impurities, and a balance of nickel.

In one embodiment, the substrate has a composition, by weight, of about 6.6% to about 7.0% chromium, about 11.45% to about 12.05% cobalt, about 5.94% to about 6.3% aluminum, up to about 0.02% titanium, about 4.7% to about 5.1% tungsten, about 1.3% to about 1.7% molybdenum, about 2.6% to about 3% rhenium, about 6.2% to about 6.5% tantalum, about 1.3% to about 1.7% hafnium, up to or between about 0.1% to about 0.14% carbon, up to or at about 0.0035% manganese, up to or at about 0.03% zirconium, up to or between about 0.01% and about 0.02% boron, up to or at about 0.2% iron, up to or at about 0.06% silicon, up to or at about 0.1% potassium, up to or at about 0.004% sulfur, up to or at about 0.1% niobium, incidental impurities, and a balance nickel.

In one embodiment, the substrate has a composition, by weight, of about 5% iron, between about 20% and about 23% chromium, up to about 0.5% silicon, between about 8% and about 10% molybdenum, up to about 0.5% manganese, up to about 0.1% carbon, incidental impurities, and a balance nickel.

In one embodiment, the substrate has a composition, by weight, of between about 13.7% and 14.3% chromium, between about 9% and about 10% cobalt, between about 2.8% and about 3.2% aluminum, between about 4.8% and about 5.20% titanium, between about 3.7% and about 4.3% tungsten, up to about 0.1% rhenium, incidental impurities, and a balance nickel. In a further embodiment, the substrate has a composition, by weight, of up to about 4.3% rhenium and tungsten, up to about 0.1% tantalum, up to 0.1% hafnium, up to about 0.19% carbon, up to about 0.15% palladium, up to about 0.3% platinum, up to about 0.01% magnesium, up to about 0.1% zirconium, up to about 0.02% boron, up to about 0.35% iron, up to about 0.1% silicon, up to about 0.1% manganese, up to about 0.015% phosphorus, up to about 0.0075% sulfur, 0.1% niobium, or a combination thereof.

In one embodiment, the substrate has a composition, by weight, of about 22% chromium, about 14% tungsten, about 2% molybdenum, up to about 3% iron, up to about 5% cobalt, about 0.5% manganese, about 0.4% silicon, about 0.3% aluminum, about 0.10% carbon, about 0.02% lanthanum, up to about 0.015% boron, incidental impurities, and a balance nickel.

In one embodiment, the substrate has a composition, by weight, of about 20% chromium, about 10% cobalt, about 8.5% molybdenum, up to about 2.5% titanium, about 1.5% aluminum, up to about 1.5% iron, up to about 0.3% manganese, up to about 0.15% silicon, about 0.06% carbon, about 0.005% boron, incidental impurities, and a balance nickel.

In one embodiment, the substrate has a composition, by weight, of between about 18% and about 20% chromium, between about 9% and about 10.5% molybdenum, between about 10% and about 12% cobalt, between about 1.4% and about 1.8% aluminum, between about 3.0% and about 3.3% titanium, up to about 0.01% boron, about 0.12% carbon, about 5% iron, about 0.1% manganese, about 0.5% silicon, about 0.015% sulfur, about 0.5% copper, incidental impurities, and a balance nickel.

In one embodiment, the substrate has a composition, by weight, of up to about 1% carbon, up to about 0.5% manganese, up to about 0.02% sulfur, up to about 0.75% silicon, between about 18.0% and about 21.0% chromium, between about 3.5% and about 5.0% molybdenum, up to about 0.1% copper, between about 12% and about 15% cobalt, between about 2.6% and about 3.25% titanium, between about 1.0% and about 1.5% aluminum, up to about 2% iron, between about 0.2% and about 0.12% zirconium, incidental impurities, and a balance nickel.

In one embodiment, the substrate has a composition, by weight, of up to about 0.01% boron, up to about 0.03% carbon, between about 19% and about 21% chromium, between about 0.01% and about 1% iron, up to about 0.15% manganese, between about 9% and about 10.5% molybdenum, between about 33% and about 37% nickel, up to about 0.015% phosphorus, up to about 0.15% silicon, up to about 0.01% sulfur, up to about 1% titanium, incidental impurities, and a balance cobalt.

In one embodiment, the substrate has a composition, by weight, of between up to about 0.15% carbon, between about 19% and about 21% chromium, up to about 3% iron, between about 1% and about 2% manganese, between about 9% and about 11% nickel, up to about 0.03% phosphorus, up to about 0.4% silicon, up to about 0.03% sulfur, between about 14% and about 16% tungsten, incidental impurities, and a balance cobalt.

In one embodiment, the substrate has a composition, by weight, of up to about 0.1% beryllium, up to about 0.15% carbon, between about 18.5% and about 21% chromium, between about 39% and about 42% cobalt, between about 1% and about 2.5% manganese, between about 6% and about 8% molybdenum, between about 14% and about 18% nickel, up to about 0.015% phosphorus, up to about 1.2% silicon, up to about 0.015% sulfur, incidental impurities, and balance iron.

In one embodiment, the substrate has a composition, by weight, of up to about 0.14% carbon, between about 26% and about 30% chromium, up to about 0.75% iron, up to about 1% manganese, between about 5% and about 7% molybdenum, up to about 1% nickel, up to about 0.25% nitrogen, up to about 1% silicon, incidental impurities, and a balance cobalt.

Referring to FIG. 1, in one embodiment, the swirling device 102 is arranged to direct the flow 104 into the hotter stream 106 and the cooler stream 108 such that the hotter stream 106 is directed in opposite or substantially opposite from the cooler stream 108 or in any other suitable manner. Such separation is achieved by pressurized gas being injected tangentially into a swirl chamber that accelerates due to rotation within the chamber and/or a tubular portion fluidly connected to the swirl chamber. In one embodiment, the swirling device 102 includes a conical nozzle at the end of the tube, allowing compressed gas to escape at that end. The remainder of the gas is forced to return in an inner vortex of reduced diameter within an outer vortex.

Figure 2:
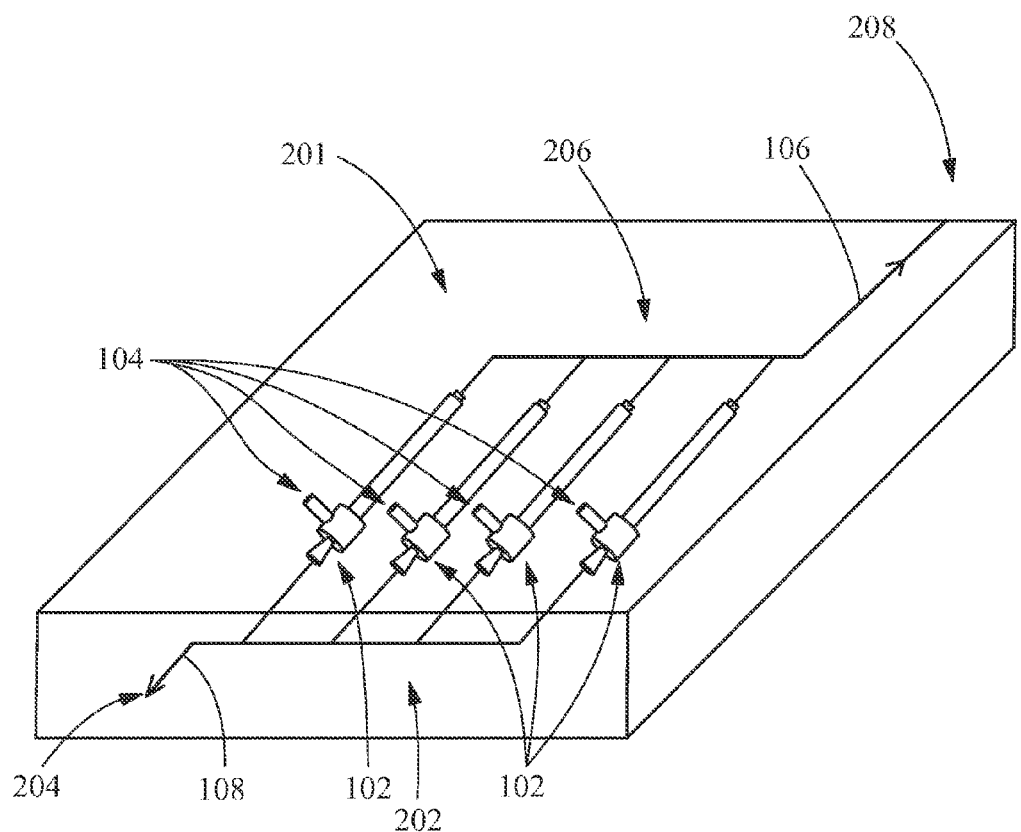
FIG. 2 is a perspective view of an arrangement of a plurality of swirling devices, specifically vortex tubes, according to an embodiment of the disclosure.

Referring to FIG. 2, in one embodiment, an arrangement 201 of the swirling devices 102 are arranged in parallel or substantially in parallel. In a further embodiment, a plurality of the cooler streams 108 merge or fluidly join a common cooling tube 202, which is capable of expelling cooling fluid (not shown), such as air, through a cooling opening/hole 204. Additionally or alternatively, a plurality of the hotter streams 106 merge or fluidly join a common tube 206, which is capable of expelling heated fluid (not shown), such as air, through a heating opening/hole 208. In one embodiment, one or more of the cooler streams 108 is directed to regions benefiting from cooling and/or the cooler stream(s) 108 forms a film. Additionally or alternatively, one or more of the hotter streams 106 is directed to regions and/or other components with lower heat loads and/or directly to a hot gas path.

Figure 3:
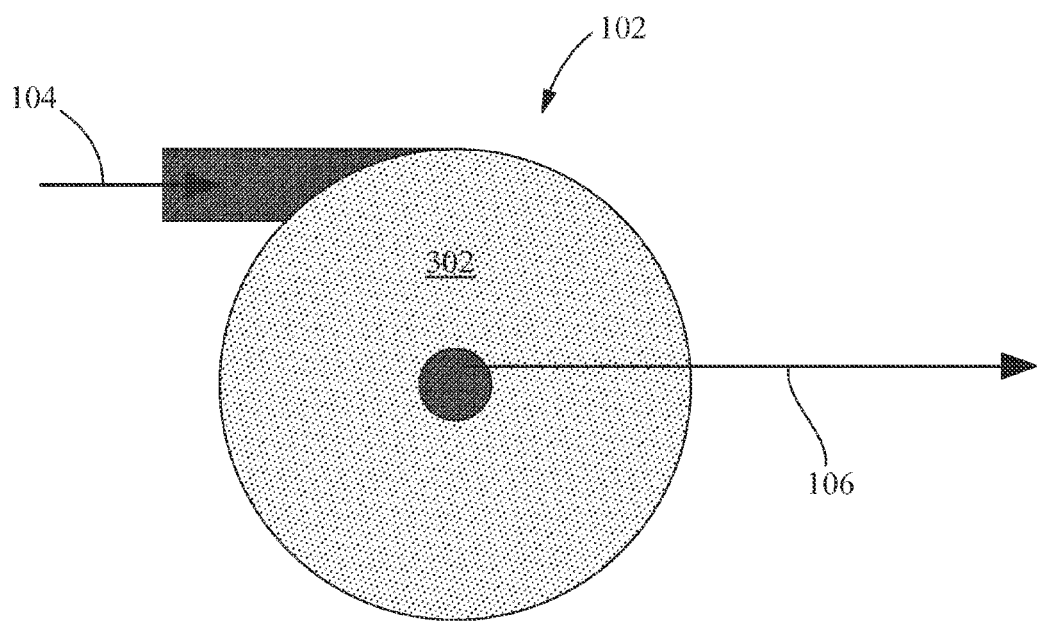
FIG. 3 is an axial schematic view of a swirling device having a circular profile, according to an embodiment of the disclosure.
Figure 4:
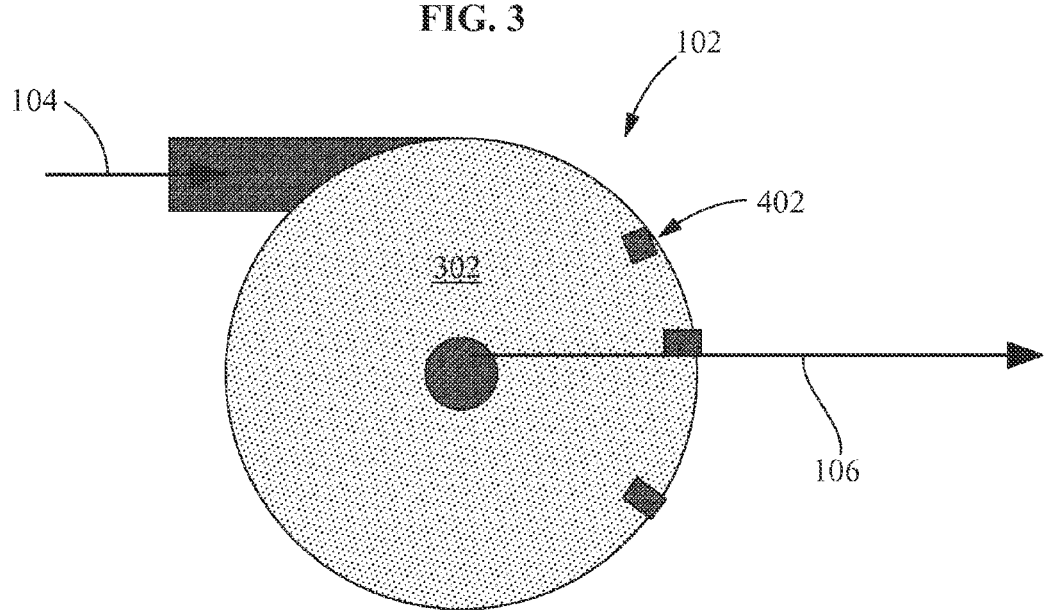
FIG. 4 is a side schematic view of an axial schematic view of a swirling device having a circular profile with internal protrusions, according to an embodiment of the disclosure.

Referring to FIG. 3, in one embodiment, the swirling device 102 includes a chamber 302 having a circular profile or substantially circular profile capable of facilitating the separation of the cooler stream(s) 108 and the hotter stream(s) 106. Alternatively, in embodiments with the swirling device 102 being the swirling heat transfer device 608, the chamber 302 facilitates heat transfer. For example, in this embodiment, the swirling device 102 increases heat transfer and hence pick up of heat by cooling air. Instead of separating the flow into two distinct flows, the device acts to swirl the air only, allowing the higher heat transfer coefficient of the air to be utilized more effectively. After being heated, the air is directed, for example, through film cooling holes and/or dumped into a hot gas path. In a further embodiment, with the swirling device 102 being the vortex tube or the swirling heat transfer device 608, as is shown in FIG. 4, the chamber 302 includes protrusions 402, such as, turbulators, guide vanes, secondary/tertiary/quaternary inlets, secondary/tertiary/quaternary outlets, or combinations thereof.

Figure 5:
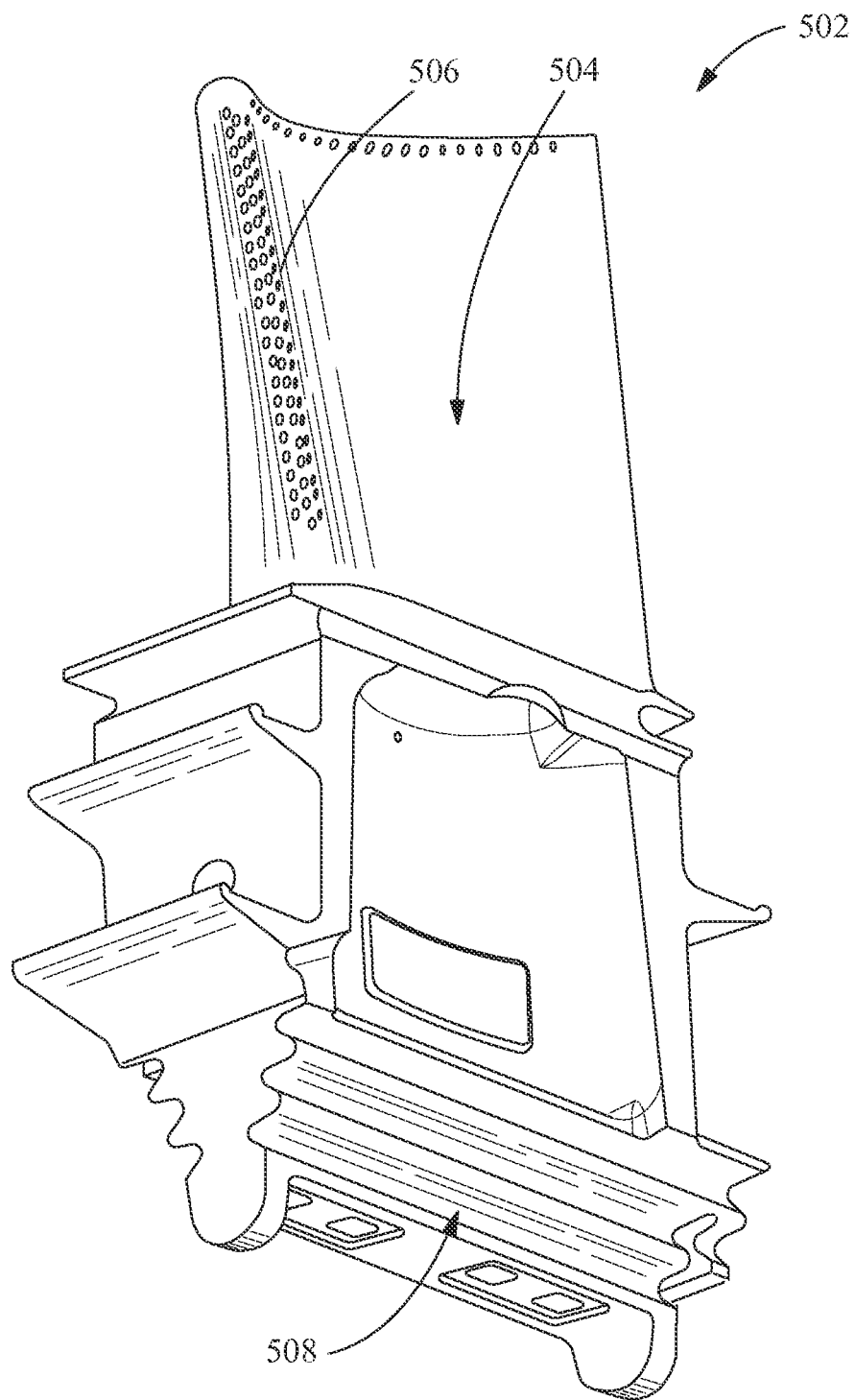
FIG. 5 is a perspective view of a turbine bucket or blade having a swirling device, according to an embodiment of the disclosure.

FIG. 5 shows a turbine bucket 502 or blade, which is printed or fabricated by any other suitable process, that includes one or more of the swirling devices 102 (see FIG. 1 or 10) positioned within or on the turbine bucket 502 or blade. In one embodiment, with the swirling device 102 being the vortex tube, the swirling device 102 is positioned in any suitable region of the turbine bucket 502 to increase or decrease cooling by separating the flow 104 (see FIG. 1)

into the hotter stream 106 (see FIG. 1) and cooler stream 108 (see FIG. 1), which are positioned to increase or decrease cooling in any suitable region. In one embodiment, the swirling device 102 is positioned proximal to a hot or suction side 504 of the turbine bucket 502, where it separates the flow 104, directs the cooler stream 108 through cooling channels toward cooling holes 506, directs the hotter stream 106 to a predetermined region such as directly into the hot gas path, back into a dovetail 508 (for example, as purge), toward a lower heat load region of the component, or a combination thereof. In one embodiment, the swirling device 102 is positioned along any hot side of a component, is sized to cover as much or as little external surface as desired, and/or is configured to expel exhausted (heated) cooling air back into the hot gas path either directly or as film cooling air. In other embodiments, with the swirling device 102 being the swirling heat transfer device 608, at least a portion of the turbine bucket 502 is cooled through heat transfer, for example, with the single stream 610 (see FIG. 6) entering the hot gas path.

Figure 6:
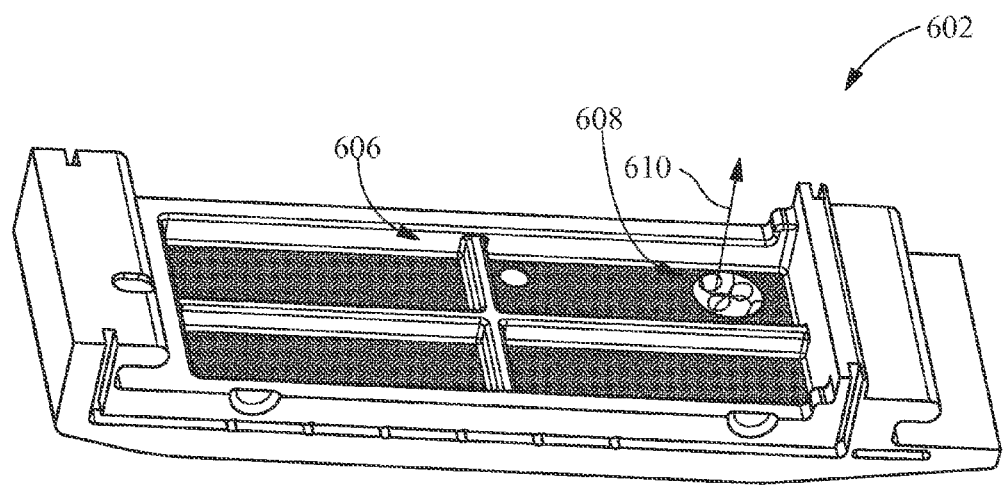
FIG. 6 is a perspective view of a cold side of a turbine shroud having a swirling device, specifically a swirling heat transfer device, according to an embodiment of the disclosure.
Figure 10:
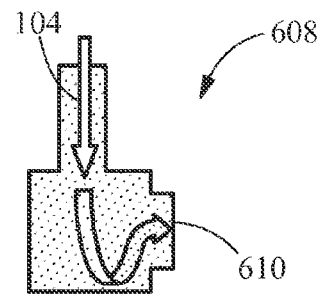
FIG. 10 is a side schematic view of a swirling device, specifically a swirling heat transfer device, according to an embodiment of the disclosure.
Figure 7:
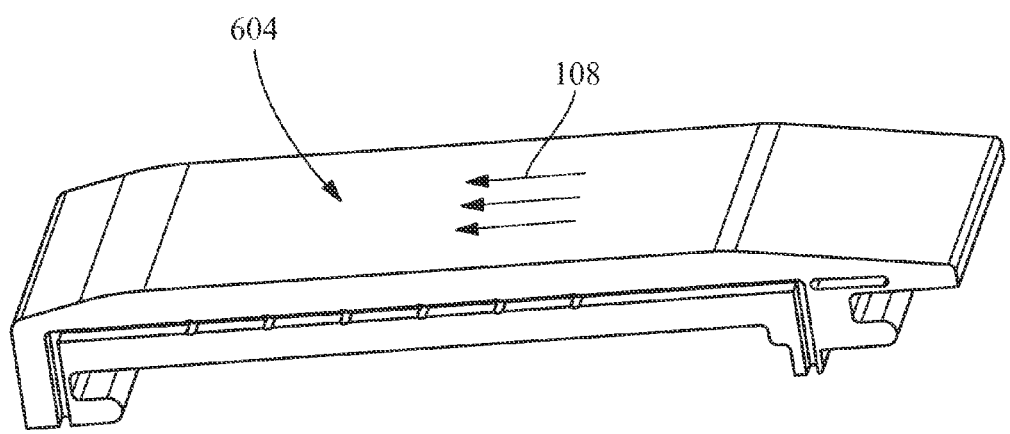
FIG. 7 is a perspective view of a hot side of the turbine shroud in FIG. 6.

FIGS. 6-7 show a turbine shroud 602, which is printed or fabricated by any other suitable process, with one or more of the swirling devices 102 (see FIG. 10), specifically the swirling heat transfer device 602, positioned in or on the turbine shroud 602. The swirling device 102 is positioned in any suitable region of the turbine shroud 602 to increase or decrease cooling. In one embodiment, the swirling device 102 is positioned along any hot side of a component, is sized to cover as much or as little external surface as desired, and/or is configured for cooling air to be sent back into the hot gas path or directed elsewhere downstream. In one embodiment, with the swirling device 102 being the vortex tube, the flow 104 (see FIG. 1) is separated into the hotter stream 106 (see FIG. 1) and cooler stream 108 (see FIG. 1), which are positioned to increase or decrease cooling in any suitable region, the swirling device 102 is positioned proximal to a hot side 604 of the turbine shroud 602, where it separates the flow 104, directs the hotter stream 106 from the hot side 604, directs the cooler stream 108 to a predetermined region, such as an edge and/or toward an un-cooled side of the turbine shroud 208, and/or the hotter stream 106 travels to a trailing edge of the turbine bucket 502, flows directly into a hot gas path, or flows downstream toward components with lower heat loads.

Figure 8:
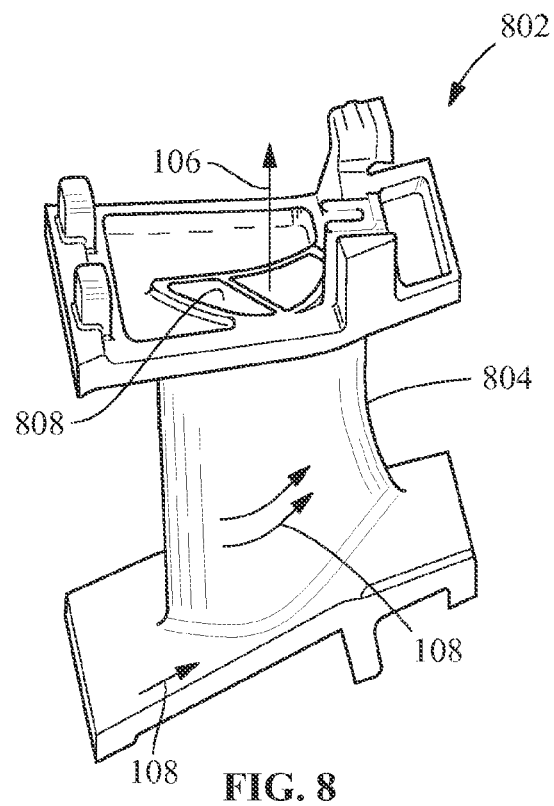
FIG. 8 is a perspective view of turbine nozzle having a swirling device, according to an embodiment of the disclosure.
Figure 9:
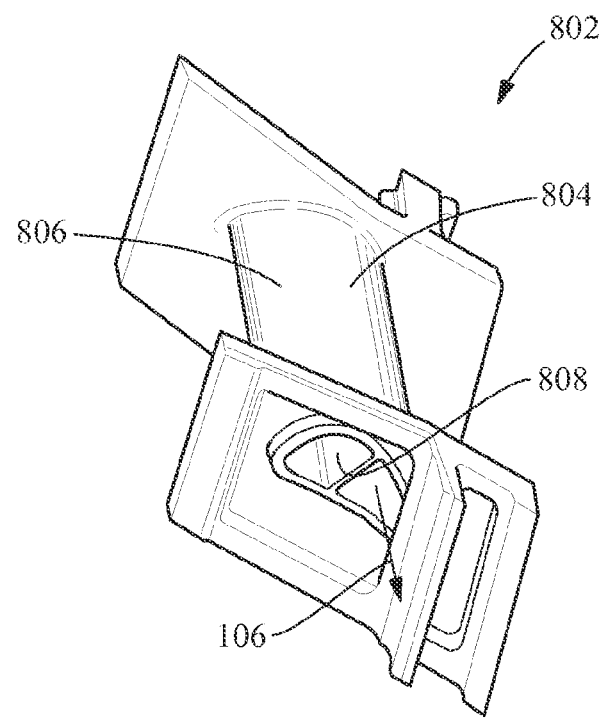
FIG. 9 is a perspective view of turbine nozzle having a swirling device, according to an embodiment of the disclosure.

FIGS. 8-9 show a turbine nozzle 802, which is printed or fabricated by any other suitable process, with one or more of the swirling devices 102 positioned in or on the turbine nozzle 802. In one embodiment, the swirling device(s) 102 is/are the swirling heat transfer device(s) 602 (see FIG. 10). In another embodiment, the swirling device(s) 102 is/are the vortex tube(s). In an embodiment with the swirling device 102 being the vortex tube, the swirling device 102 is positioned in any suitable region of the turbine nozzle 802 to increase or decrease cooling by separating the flow 104 (see FIG. 1) into the hotter stream 106 (see FIG. 1) and cooler stream 108 (see FIG. 1), which are positioned to increase or decrease cooling in any suitable region. In one embodiment, the swirling device 102 is positioned proximal to a hot side 804 of the turbine nozzle 802, where it separates the flow 104, directs the hotter stream 106 toward cooling holes 806, directs the cooler stream 108 to a predetermined region, such as along cooling channels in a hot side of the turbine bucket 502 toward the leading edge of the turbine bucket 502, and/or toward un-cooled sides of the turbine shroud 208. In one embodiment, the hotter stream 106 flows to the trailing edge of the turbine bucket 502, flows to the hot gas path, and/or flows downstream toward components with lower heat loads.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for forming a thermally managed turbine component, comprising:
    forming a turbine component, the component being selected from the group consisting of a turbine shroud, a turbine bucket, and a turbine nozzle; and
    forming a plurality of vortex tubes in a substantially parallel arrangement in the turbine component by a three-dimensional printing process, the three dimensional printing process including distributing a material to a selected region and selectively laser melting the material,
    wherein the plurality of vortex tubes are arranged and disposed to tangentially accept a pressurized fluid into chambers of the plurality of vortex tubes having circular or substantially circular profiles, and divide the pressurized fluid into first fluid streams and second fluid streams, the first fluid streams having elevated temperatures relative to the second fluid streams.

2. The process of claim 1, wherein forming the plurality of vortex tubes includes forming a plurality of Ranque-Hilsch vortex tubes.

3. The process of claim 1, further comprising forming at least one cooling channel in fluid communication with the plurality of vortex tubes, the cooling channel being arranged and disposed to accept the second fluid streams.

4. The process of claim 1, further comprising forming the plurality of vortex tubes in a turbine shroud as the turbine component.

5. The process of claim 1, further comprising forming the plurality of vortex tubes in a turbine bucket as the turbine component.

6. The process of claim 1, further comprising forming the plurality of vortex tubes in a turbine nozzle as the turbine component.

7. The process of claim 1, further comprising arranging and disposing the plurality of vortex tubes to be in fluid communication with respect to the first fluid streams with at least one of a hot gas path of a turbine, a portion of the turbine component to be purged, and a portion of the turbine component having a lower heat load.

8. The process of claim 1, wherein the selectively laser melting is in an inert gas atmosphere.

9. The process of claim 1, wherein the selectively laser melting is repeatedly performed to form the plurality of vortex tubes.

10. The process of claim 1, wherein the plurality of vortex tubes are formed from two-dimensional slices having a thickness between about 20 micrometers and about 100 micrometers.

11. The process of claim 1, wherein the plurality of vortex tubes are produced near-net-shape.

12. The process of claim 1, further including forming a turbulator in the chamber of at least one of the plurality of vortex tubes.

13. The process of claim 1, wherein the material is an atomized powder.

14. The process of claim 13, wherein the selectively laser melting is selected from the group consisting of electron beam melting, laser melting, and combinations thereof.

15. The process of claim 1, wherein the selected region is a substrate plate and the distributing of the materials is performed by using a coating mechanism.

16. The process of claim 15, wherein the material is selected from the group of materials consisting of thermoplastics, metals, metallics, ceramics, and combinations thereof.

17. The process of claim 15, wherein the material is selected from the group of materials consisting of stainless steel, tool steel, cobalt chrome, nickel, titanium, aluminum, nickel-based superalloys, cobalt-based superalloys, and combinations thereof.

* * * * *